(12) United States Patent
Elberbaum

(10) Patent No.: US 7,315,685 B1
(45) Date of Patent: Jan. 1, 2008

(54) METHOD AND APPARATUS FOR CONTINUOUS FEED OF DISKS FOR RECORDING DIGITAL VIDEO SIGNALS AND AUTHENTICATING THE DIGITALLY RECORDED DISKS

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 923 days.

(21) Appl. No.: 09/688,901

(22) Filed: Oct. 16, 2000

(51) Int. Cl.
*H04N 5/91* (2006.01)
*H04N 5/00* (2006.01)
*H04N 7/167* (2006.01)

(52) U.S. Cl. .............................. 386/1; 386/46; 386/95; 386/96; 386/125; 386/126; 380/201; 380/202; 380/207

(58) Field of Classification Search ................... 386/46, 386/94, 95, 124, 125, 103, 106, 96, 126, 386/123; 348/153; 380/201, 202
See application file for complete search history.

(56) References Cited

U.S. PATENT DOCUMENTS

| | | | | |
|---|---|---|---|---|
| 6,085,975 | A * | 7/2000 | Irvine et al. ................. | 235/383 |
| 6,188,659 | B1 * | 2/2001 | Mueller et al. .......... | 369/59.24 |
| 6,222,800 | B1 * | 4/2001 | Miller et al. ............. | 369/30.19 |
| 6,249,835 | B1 * | 6/2001 | Isoda .......................... | 710/100 |
| 6,295,139 | B1 * | 9/2001 | Yamauchi et al. .......... | 358/443 |
| 6,301,430 | B1 * | 10/2001 | Oguro et al. .................. | 386/94 |
| 6,389,217 | B1 * | 5/2002 | Ohno et al. .................... | 386/46 |
| 6,463,026 | B1 * | 10/2002 | Anderson .................... | 720/719 |
| 6,618,335 | B2 * | 9/2003 | Tanaka et al. ............ | 369/53.21 |
| 6,782,190 | B1 * | 8/2004 | Morito ......................... | 386/94 |

* cited by examiner

*Primary Examiner*—John Miller
*Assistant Examiner*—Jamie J Vent
(74) *Attorney, Agent, or Firm*—Katten Muchin Rosenman LLP

(57) ABSTRACT

A digital signal recording apparatus a method of operating the same, used in conjunction with TV and video cameras, for example for security applications, includes a disk feeder system having a disk recorder and an upper compartment for holding fresh unrecorded disks, a pull slider assembly which pulls a first fresh disk at the bottom of the compartment and places the same and a printing head assembly which imprints coded information onto the placed disk, a disk recorder having a sliding table for supporting the disk and a lower compartment which accommodates the recorded disks. Supported by the sliding table the recorded disk is retracted into the disk recorder which, after the completion of recording, generates a command signal to start a new cycle. An exclusive code is imprinted onto the surface of the disk and coded signals commensurate with the exclusive code are generated by a controller and mixed with the digital video signals recorded by the disk recorder to authenticate the recording of the disk outputted from the disk feeder system.

24 Claims, 8 Drawing Sheets

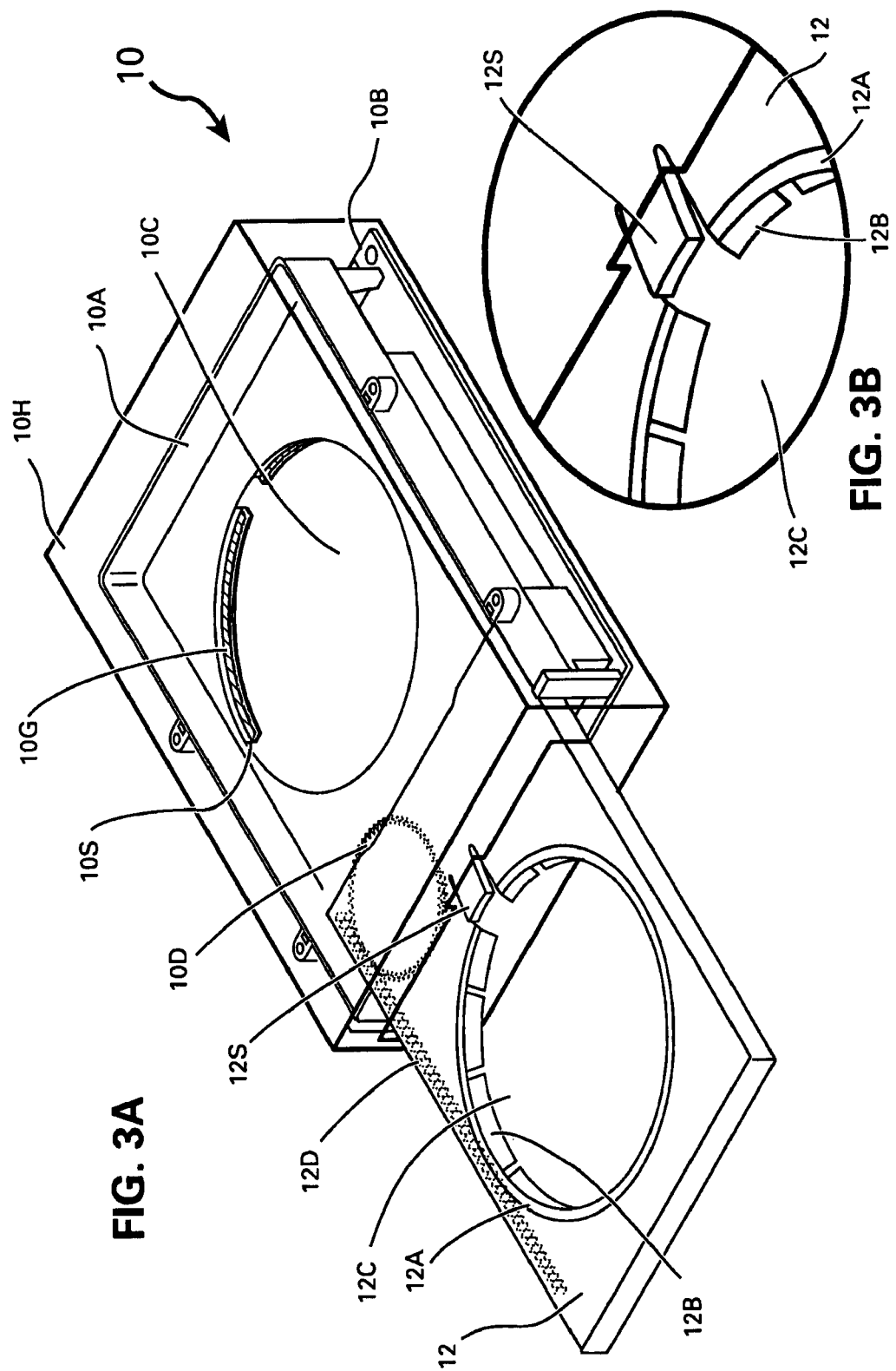

METHOD AND APPARATUS FOR CONTINUOUS FEED OF DISKS FOR RECORDING DIGITAL VIDEO SIGNALS AND AUTHENTICATING THE DIGITALLY RECORDED DISKS

BACKGROUND OF THE INVENTION

1. Field of the Invention

This invention relates to digital recording apparatuses used in conjunction with television and video cameras for observation, monitoring and security applications.

2. Description of the Prior Art

Signals of television cameras used in an observation system are fed to the monitoring site via closed wired circuits, or via public communication lines such as analog telephone lines or digital telephone lines, or via computer network or via RF links are commonly recorded onto a video cassette, such as the well known VHS, using VHS recorder. The VHS recorder is an analog recorder for recording analog television signals. Such analog recording onto VHS cassettes have been accepted by the courts at large as evidence, primarily on the grounds that the altering of the signals content is extremely difficult and moreover, such tampering with the recorded signals by trying to alter its content can be detected by experts. Moreover, the wide use of such analog recording onto VHS cassettes made the analog recording low in cost and popular. With the recent advances in digital recording of television signals it became simple to record the signal of television cameras used in observation system onto a hard disk of a PC or onto a hard disk of a specially constructed digital recorders, However, the hard disk of the PC or of the digital recorder has a finite capacity, which limits the length of time for archiving and/or storing the accumulated recorded signals. This can be solved by adding multiple hard disk or by using retractable hard disks. However, such retractable hard disk is very costly and requires expertise in handling. Another method to archive and store the recorded digital signals is by transferring the recorded digital signals onto digital tapes, cassettes, diskettes or disks such as the well-known CD or DVD.

This however causes a serious legal problem, hindering the use of the recorded material in courts; first because the recording is no longer the original recorded media, and secondly, it is literally impossible to identify the original from a copied or transferred data, and thirdly it is simple to alter a digitally recorded picture by changing its color, changing its time and date, removing objects from the picture content or adding objects into the picture. The ability to present a modified picture and to present a copied recording as an original recording, prevents the use of the digitally recorded pictures on tape, disk or diskette as evidence in courts. Furthermore, the tapes, disks and diskettes offer a limited recording time for no more than several hours which requires constant attendance for unloading and loading the tapes, disks and the diskettes, alternatively there are variety of automatic machines known as "juke boxes" for loading, unloading the recorded media that also provide for management of the recorded data. Such juke boxes however have also a finite data storage capacity and are very costly.

SUMMARY OF THE INVENTION

An object of the present invention is to provide a method and apparatus for automatically feeding disks into a digital recorder and for automatically authenticating the recorded disks by imprinting coded information onto the disks and recording a coded data commensurating with the imprinted code into the picture signals, thereby providing the means for authentication of the disk as an original recorded media.

Another object of the invention is to provide a low cost disk changer that can record continuously a number of disks for an extended period of time by means of a simple loading of fresh unrecorded disks and simple unloading of the imprinted/recorded disks.

The above objects are achieved by an apparatus for digital recording, which comprises an imprinting head assembly, an upper compartment for holding fresh unrecorded disks, a pull slider assembly for pulling a first fresh unrecorded disk at the bottom of the upper compartment and for placing the pulled fresh unrecorded disk under said imprinting head assembly, said imprinting head assembly imprinting coded information onto the freshly placed disk, a disk recorder having a sliding table for supporting said disk, and a lower compartment for accommodating accumulated imprinted/recorded disks. The pull slider and the sliding table operate in concert such that when the pull slider and the sliding table are fully extended the freshly pulled disk and the imprinted/recorded disk are aligned against each other under the imprinting head. The imprinting head is mounted under a sliding piston to slide down and engage the freshly pulled disk for imprinting the coded information onto the disk surface and for pushing downward the freshly imprinted disk away from the pull slider and into the sliding table, which in turn ejects the imprinted/recorded disk from the sliding table into the lower compartment. Supported by the sliding table, the freshly imprinted disk is retracted into the disk recorder for recording. Simultaneously, the sliding piston starts its upward movement raising the imprinting head while the pull slider retracts into the pull slider assembly readying itself for the next disk pull cycle. As the disk recorder completes its recording it will generate a command signal to start a new cycle of pulling, imprinting and loading a fresh disk into the sliding table to finally eject the newly recorded disk in an endless rotation for as long as fresh disks are loaded into the upper compartment and the imprinted/recorded disks are removed from the lower compartment.

The objects of the invention are also attained by a method for authenticating the recording of digital video signals onto a fresh unrecorded disk by a disk recorder of a disk feeder system including coding generating and mixing means, and a code imprinter, the method comprising the steps of: feeding said fresh disk from a fresh disk compartment of said disk feeder system to said disk recorder through said code imprinter; generating an exclusive code for each said fresh disk fed to said disk recorder and imprinting said exclusive code onto a surface of said fresh disk such that an imprinted disk is fed to said disk recorder; and generating coded signals commensurating with said exclusive code and mixing said coded signals with said digital video signals recorded by said disk recorder, thereby authenticating said recording of the recorded disk outputted from said disk feeder system.

The objects of the present invention are further attained by a method for authenticating the recording of digital video signals onto a coded disk by a disk recorder of a disk feeder system including a code reader and a code generating and mixing means wherein said coded disk includes an exclusive code imprinted onto its surface, the method comprising the steps of: feeding said coded disk from a fresh disk compartment of said disk feeder system to said disk recorder through said code reader; reading said exclusive code of said coded disk fed to said disk recorder; and generating coded signals commensurating with said exclusive coded and mixing said coded signals with said digital video signals recorded by said disk recorder, thereby authenticating said recording of the recorded disk outputted from said disk feeder system.

The method of the present invention may be adapted for authenticating the reading back of the digital video signals recorded, from the recorded disk, wherein the disk recorder further includes readback means and said disk feeder system further includes a code reader and a code signal extractor and a comparator, and method further comprising the steps of: loaded said recorded disk into said fresh disk compartment for feeding said recorded disk to said disk recorder through said code reader for reading said exclusive code from the surface of said recorded disk and reading back said video digital signals through said readback means; and extracting said coded signals through said code extractor and comparing said reading of said exclusive code with said extracted coded signals and outputting authentication signals when said exclusive code and said coded signals commensurate.

BRIEF DESCRIPTION OF THE DRAWINGS

The foregoing and other objects and features of the invention will become apparent from the following description, given as a non restrictive example and made with reference to the accompanied drawings, in which:

FIG. 3A is a perspective view of a pull slider assembly for pulling a fresh disk from a fresh disk stack of the apparatus of the present invention;

FIG. 3B is a top view of a pull slider of the pulling slider assembly of FIG. 3A;

DETAILED DESCRIPTION OF THE PREFERRED EMBODIMENT

Figure 1:
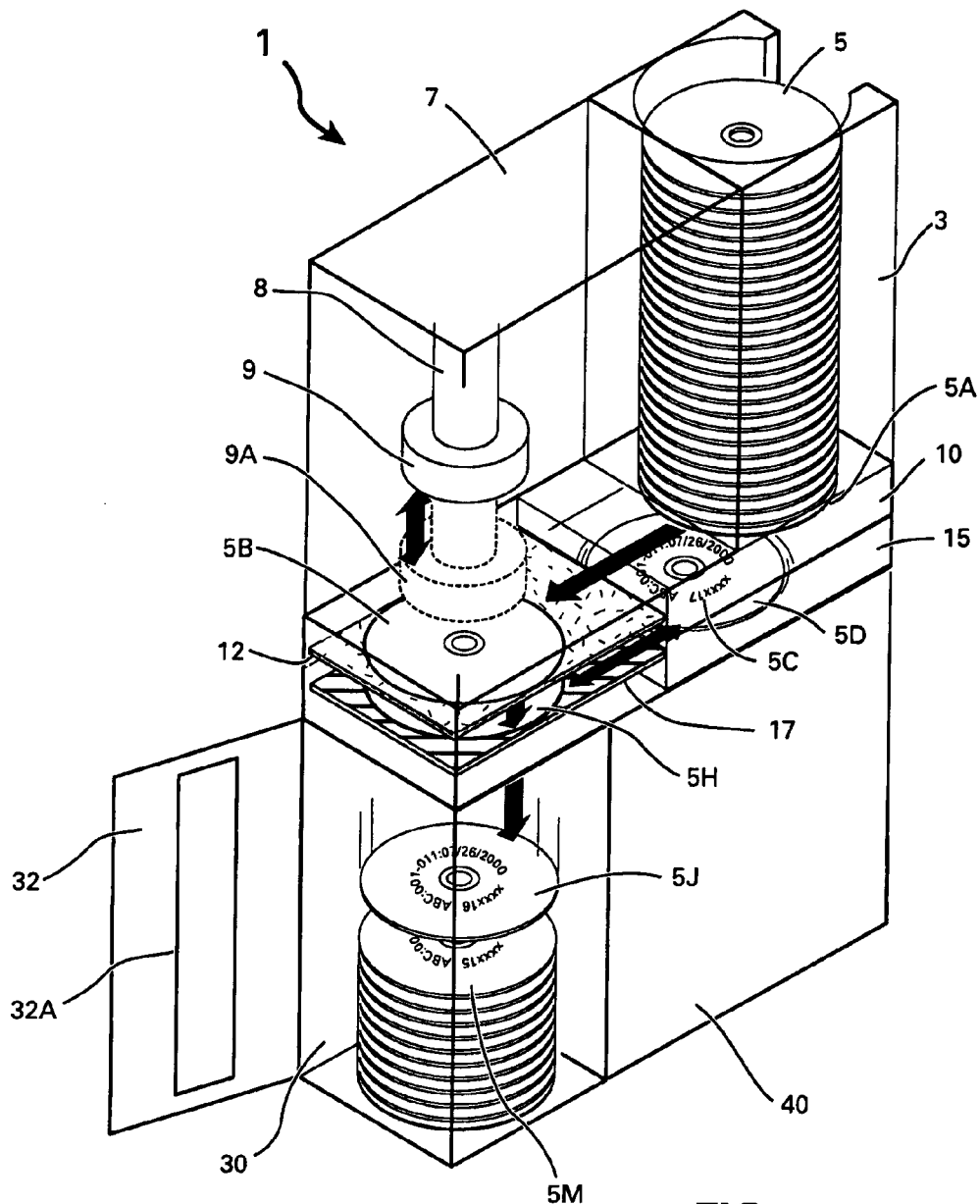
FIG. 1 is a perspective view of an exemplary embodiment of a digital recording apparatus according to the invention.

FIG. 1 shows an exemplary embodiment of a digital recording apparatus 1 which includes a compartment 3 for holding a fresh stack of disks 5 on top of a pull slider assembly 10. The pull slider assembly includes a pull slider 12 that is shown extended all the way out from the pull slider assembly 10, containing and supporting a pulled fresh disk 5B into a position directly under an imprinting head 9. A disk recorder 15 which is mounted under the pull slider assembly 10, includes a sliding table 17 shown in its extended state and supporting an imprinted/recorded disk 5H in a position directly under the fresh disk 5B. An imprinting assembly 7 which has the imprinting head 9 is attached to a sliding piston 8 which slides down to engage the imprinting head 9 with the upper surface of the fresh disk 5B for imprinting a coded information 5C onto the disk 5B and for pushing the disk 5B downward out from the pull slider 12 all the way toward the imprinted/recorded disk 5H in order to insert the newly imprinted disk 5B into the sliding table 17 and eject the imprinted/recorded disk 5H from the sliding table 17 into a lower compartment 30. The ejected disk 5H shown in FIG. 1 falls as a free falling disk 5J onto an accumulated imprinted/recorded disk stack 5M. A compartment cover 32 is shown opened but it is normally closed during the operation. The compartment cover 32 has a window 32A for instant view of the lower compartment content.

Figure 2:
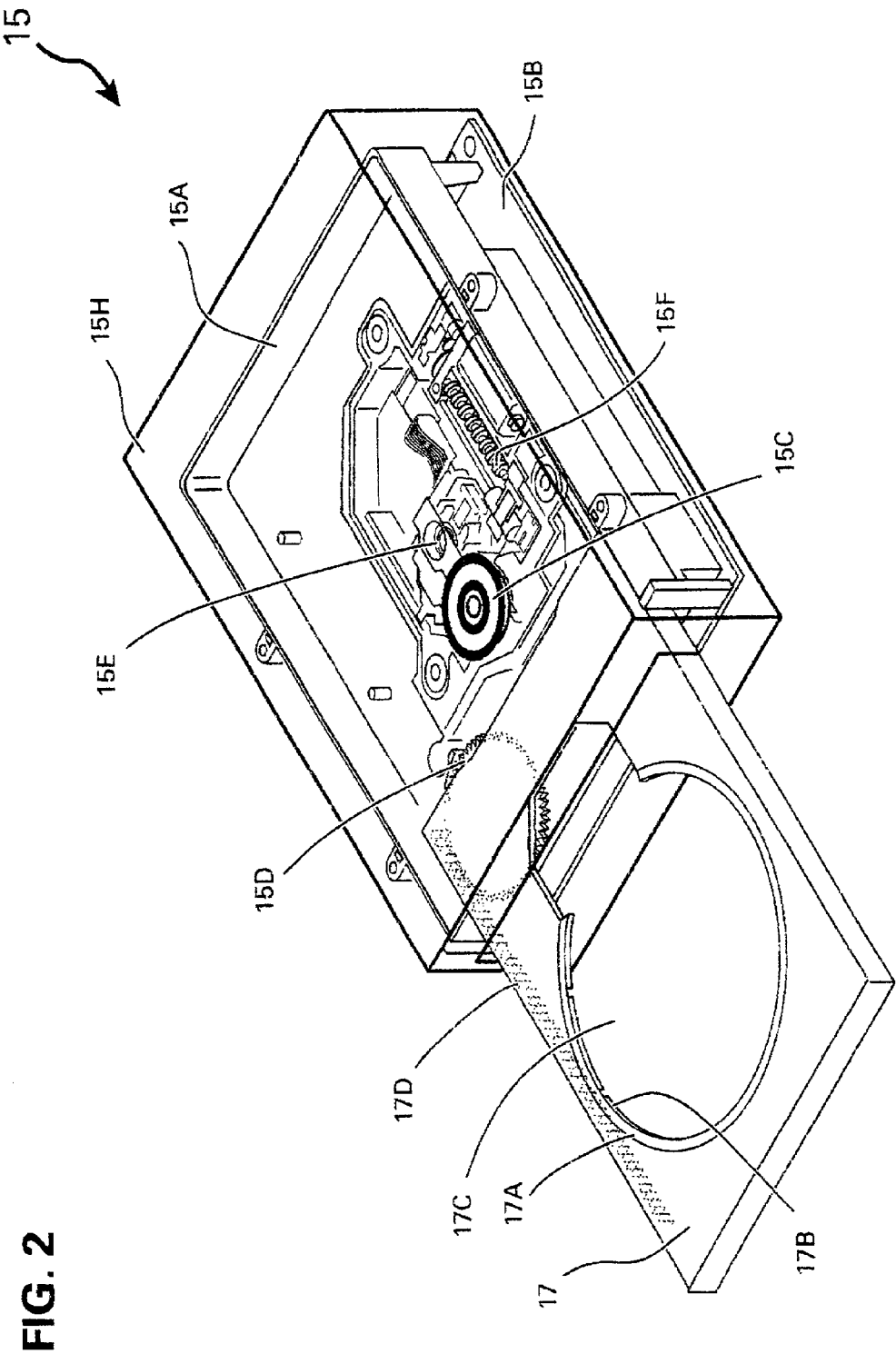
FIG. 2 is a perspective view of a well-known disk recorder with a modified sliding table to enable the ejection of a disk downward.

As the ejected disk 5J falls into the lower compartment 30 the sliding piston 8 shown in lowered position along with the imprinting head starts its upwards movement cycle away from the pull slider 12 so as to bring the imprinting head 9 into its rest position. Immediately after the imprinting head 9 is pulled up the pull slider 12 that is now emptied from the disk 5B starts its retracting cycle back into the pull slider assembly 10. Simultaneously the sliding table 17 that is now loaded with a fresh disk 5B with an imprint 5C starts its retracting cycle back into the disk recorder 15. The disk recorder 15 shown in FIG. 2 with its sliding table 10 is modified to provide for ejecting the disk downwards, is a well-known disk recorder used in personal computers, such as CD or DVD recorders. The disk recorder 15 will start its recording of picture signals fed to it through the electronic circuits contained in the system control 40 shown in detail in FIG. 9 and described in detail below. The system control 40 also generates the imprinted coded information 5C, and mixes commensurating coded signals into the recording of the pictures signals which ties together the physical imprint of the disk to the contained recorded signals, for authenticating the imprinted disk as an original media. Referring to FIG. 2 the disk recorder 15 comprises a case 15H, a body 15A, a recording control circuit 15B, a recording and playback head 15E, a disk drive 15C, a head drive 15F and the sliding table 17. The sliding table 17 includes a geared bar 17D driven by a driving gear 15D reciprocally, and a motor controlling the gear 15D. Such a motor is a well known motor with a gear assembly and is therefore not shown. The sliding table further includes an opening 17C for providing the supported disk 5H of FIG. 1 to be ejected downwards, a tapered circumferential rim 17A for supporting the disk 5B or 5H of FIG. 1 while moving the disk in and out from the disk recorder, and circumferentially extending tongs 12B for gripping the disk 5H prior to the final ejection. The disk drive 15C of the well known disk recorder 15 raises the disk upwards away from the sliding table 17 during the recording or playback process, by the well known disk drive 15C and lifting mechanism (not shown), and the recording/playback head 15E travels throughout the width of the disk by the well known head drive mechanism 15 (not shown). Accordingly, the supported freshly imprinted disk 5B of FIG. 1 is driven into the disk recorder 15 by the sliding table 17; it is then lifted by the disk drive 15C for recording, and when the recording is complete the disk drive 15C lowers the freshly recorded disk 5D onto the sliding table which is then extended outwards by the drive gear 15D and placed into the position under the fresh pulled disk 5B. The pull slider assembly 10 is constructed essentially with a pull-sliding table 12 similar to the sliding table 17 of the disk recorder 15.

Shown in FIGS. 3A and 3B, is the pull slider assembly 10 including a case 10H, a body 10A, a control circuit 10B, an opening for fresh disks 10C, a support 10S for the first disk in the stack, a cushion 10G and a pull slider 12. The pull slider 12 includes a geared bar 12D driven by the driving gear 10D reciprocally, an opening 12C for allowing a fresh disk to be pushed through downwards, a tapered circumferentially extending rim 12A for centering the pulled disk and tongs 12B extending downwards from the rim 12A for gripping the pushed disk during the imprinting process. The pull slider 12 further has a flexible pull lever 12S shown in FIG. 3A for pulling the first or the bottom disk 5A from the fresh disk 5 stack shown in FIG. 1.

Figure 4A:
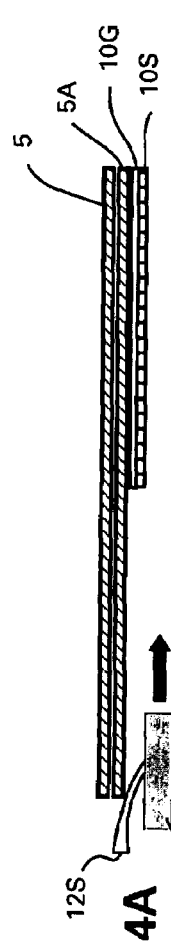
FIGS. 4A–4E are cross-sectional views showing the process of pulling and loading a fresh disk into the pull slider of FIGS. 3A and 3B.
Figure 4B:
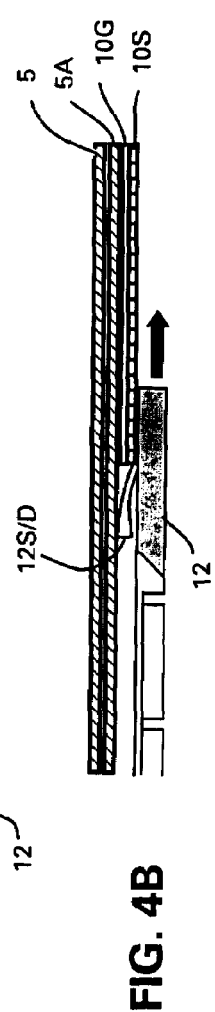
Figure 4C:
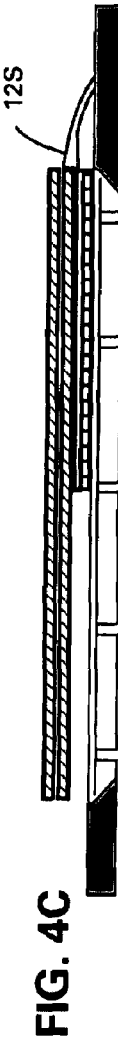
Figure 4D:
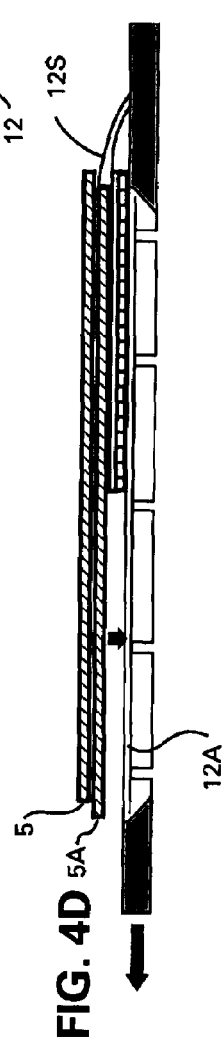
Figure 4E:
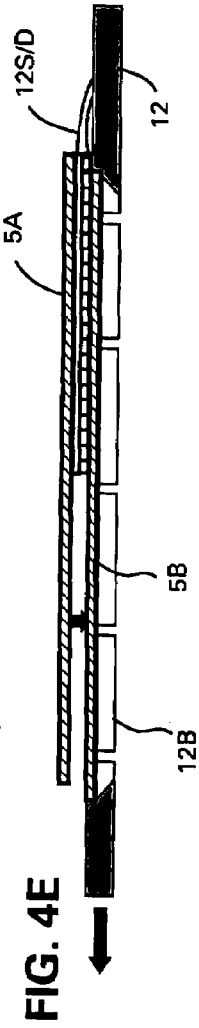

FIGS. 4A–FIG. 4E show the process of pulling and feeding the disk 5A into the sliding table, wherein FIG. 4A shows the pull slider 12 at its initial retraction and the flexible pull lever 12s which is about to be compressed under the disk 5A. FIG. 4B shows the pull slider 12 at its mid-way retraction with the pull lever 12S/D slides under the disk 5A. FIG. 4C shows the pull slider 12 fully retracted and the pull lever 12S stretching fully behind the disk 5A, ready to engage the disk rim. FIG. 4D shows the pull slider 12 in its early movement outwards pulling the disk 5A to a point just before the disk 5A leaves its support 10S and cushion 10G. FIG. 4F shows the disk 5B being pulled by the movement of the pull slider 12 outwards and falling into the tapered rim 12A while the newly first fresh disk 5A falls onto the cushion 10G.

When the recording of the disk is complete the control system 40 generates a start cycle command to the pull slider 12 to pull and feed a fresh disk 5B to its imprinting position under the imprinting head and to the sliding table to remove the imprinted/recorded disk 5D from the disk recorder and position the disk under the disk 5B. Thereafter, as the disks are positioned under the imprinting head 9 the piston 8 starts its downward movement to engage the printing head 9 with the upper surface of the fresh disk 5B and thereby push the imprinted disk 5B downwards into the sliding table 17 all the way so that the imprinted/recorded disk 5H is ejected into the lower compartment 30.

Figure 5:
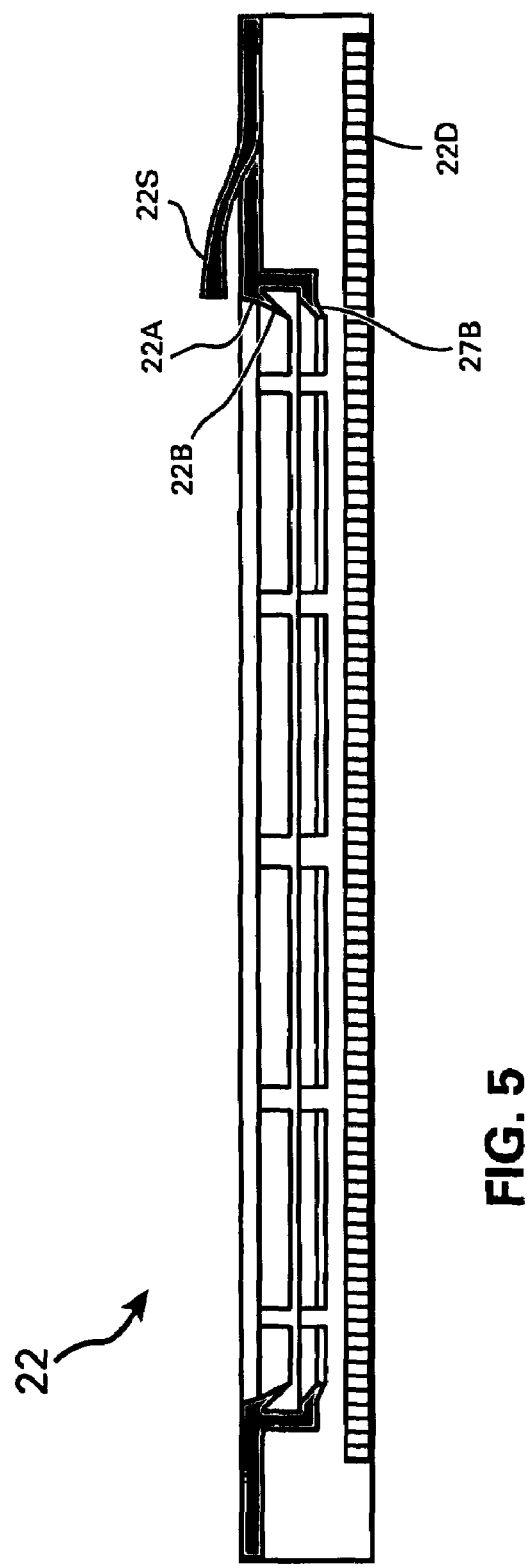
FIG. 5 is a sectional view of a combined pull slider and the sliding table of FIG. 2 and FIG. 3.

FIG. 5 shows the pull slider and the sliding table being combined into a sliding table 22 in which the pulling of a disk from the fresh disk compartment and the feeding of the disk to the disk recorder is performed by a single sliding table, wherein the tapered rim 12A, tongs 12B and the pull lever 12S of the pull slider 12 are replaced by a tapered rim 22A, tongs 22B and a pull lever 22S of the combined slider 22. The tapered tongs 17B and the geared bar 17D of the sliding table 17 are replaced by tapered circumferentially extending tongs 27B and a geared bar 27D of the combined slider 22, which otherwise operates in the same manner as the two individual sliders 12 and 17.

The shown pull lever 12S of FIGS. 3A and 3B or the pull lever 22S of FIG. 5 are simplified illustrations of a pull lever. In practice such lever may be supplied with means for preventing damage to the disk surface, by using rollers, balls or other rotating parts to prevent direct touch by the pull lever onto the surface of the disk. Similarly, the tapered rim 12A or the tong 12B of FIG. 3A and the tongs 17B of FIG. 2 or the tapered rim 22A and the tongs 22B and 27B of FIG. 5 are simplified illustrations of the support means for the processed disks. Many other shapes and forms can be used for placement, support and ejection of the processed disks. Similarly, the geared bars 12D and/or 27D of FIG. 3A and FIG. 5, respectively, along with the drive gears 10D and 15D can be differently constructed to drive the sliding table 17, the pull slider 12 or the combined slider 22.

Figure 6:
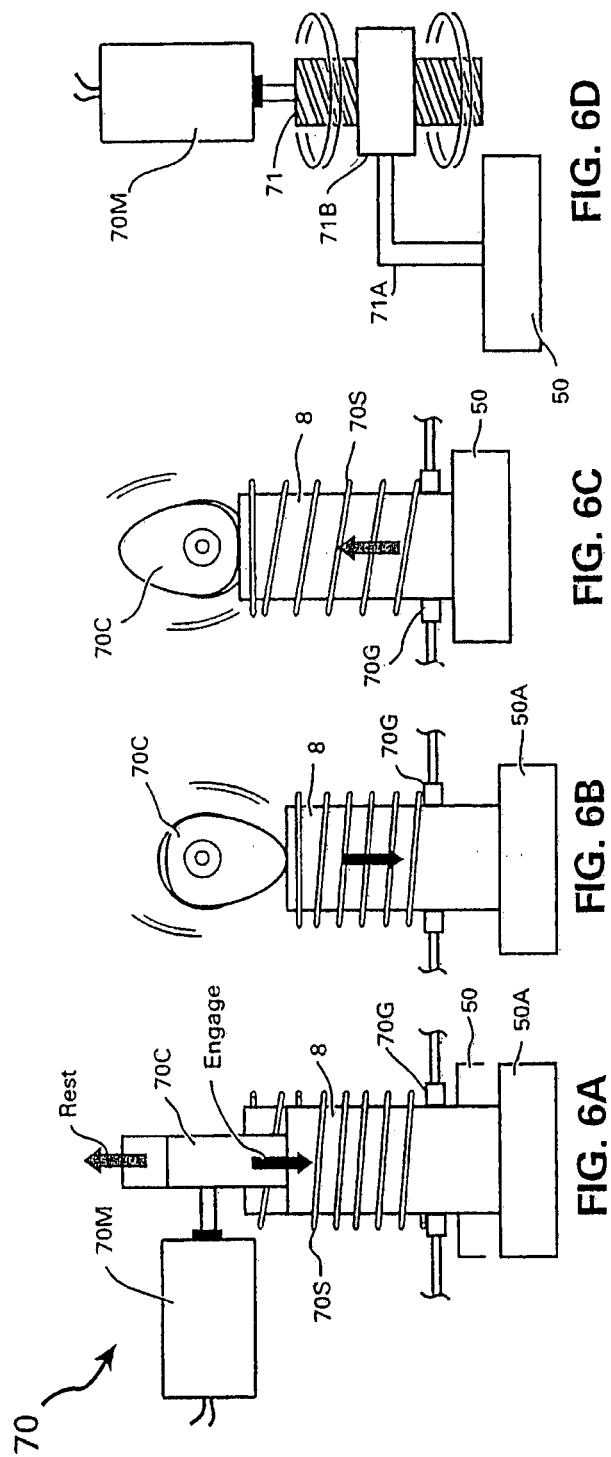
FIGS. 6A–6D are side and front views, respectively, of an imprinting head assembly in its engage-rest states.

Shown in FIG. 6A, FIG. 6B and FIG. 6C is an imprinting head assembly 70 which consists of the imprinting head 9, piston 8, a motor assembly 70M, a cam 70C, a spring 70S and a guide 70G. FIG. 6A shows a side view of the assembly 70 with the piston 8 and the imprinting head 9 in their engaged state denoted at 50A and their rest state denoted at 50, FIG. 6B shows a front view of the assembly 70 in its engaged state identical to that of FIG. 6A, with its spring 70S fully compressed, while FIG. 6C shows the same front view of the assembly but with its piston 8 in a raised position and the imprinting head 9 being in its rest position. The spring 70S of FIG. 6C shown in its decompressed or expanded state. The guide 70G shown attached to part of the body of the imprint assembly 7 (not shown in these figures) is a well-known bushing for guiding the piston up-down movement. FIG. 6D shows another well known reciprocal arm 71A supporting the imprinting head 9 attached to a threshold bushing 71B driven up-down by a threaded shaft 71 and powered by the motor 70M. The illustrated movement of the imprinting head assembly is achieved by use of a well known up-down piston or a threaded shaft driven mechanism. However, there are many other well known mechanical devices to drive an imprinting head up-down and for applying pressure onto the imprinted disk while imprinting a coded information 5C shown in FIG. 1 so as to place/eject the disks into and from their respective sliders. The imprinting head itself can be a well known laser imprinter, a well known heat stamping head, a well known LED illuminator/imprinter, a well known ink jet imprinter, a well known optical/chemical imprinting head, a well known ribboned imprinter, or a well known adjustable rubber pad. Many other well known imprinting methods and heads can be utilized and moreover, as will be explained later, the fresh disks 5 of FIG. 1 can be fed already imprinted to the fresh disk compartment 3 and/or the imprinter head can be replaced by a well known sticker applicator, sticking imprinted bar codes or other imprinted coded, non removable stickers onto the fresh disk surface.

Figure 7:
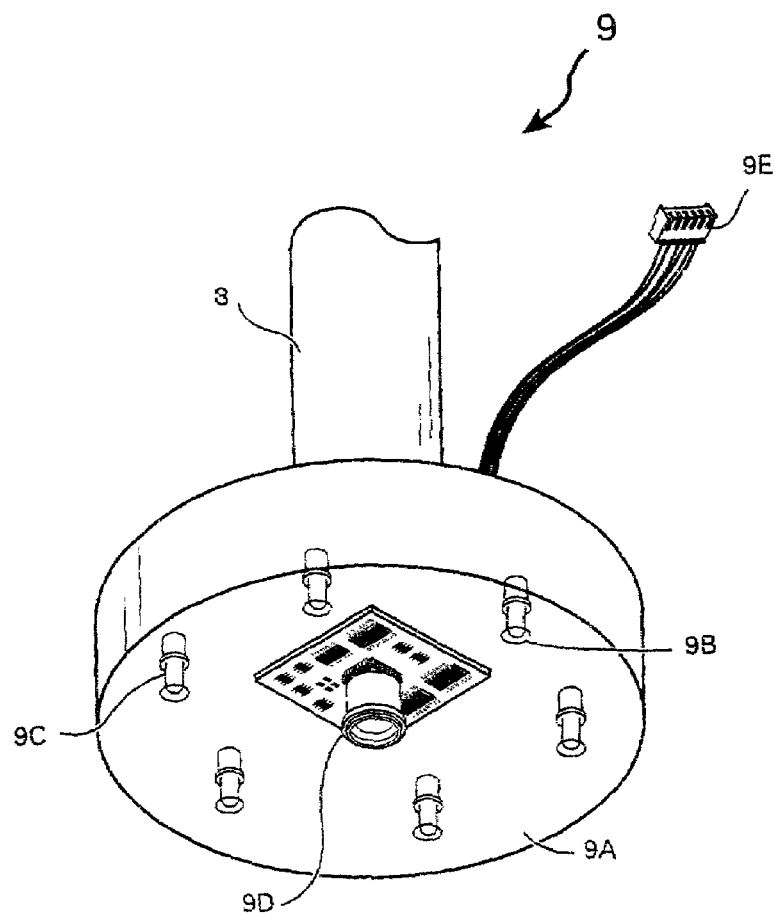
FIG. 7 is a perspective view of the imprinting head incorporating an imprint readout device.

Shown in FIG. 7 is the imprinting head assembly 9 including a transparent surface 9A for providing a light passage for lasers 9B or LEDs along with a reader/ sensor 9D for reading the imprinted code. The reader/ sensor 9D shown uses a wide angle lens with an CCD device. However, any other well known type of imprint reader/sensor such as CMOS, pin diodes or photo transistors can be used instead. The lasers 9B and LEDs 9C can be used for the imprinting process, while the LEDs 9B can be used for illuminating the imprint to enable the reader/sensor 9D to read the imprint such as the imprinted code 5C shown in FIG. 1.

The conventional disk recorder 15 shown in FIG. 2 further includes playback circuits for reading the signals from the recorded disk and for outputting the playback signals to a processing circuits of the system control 40.

Figure 9:
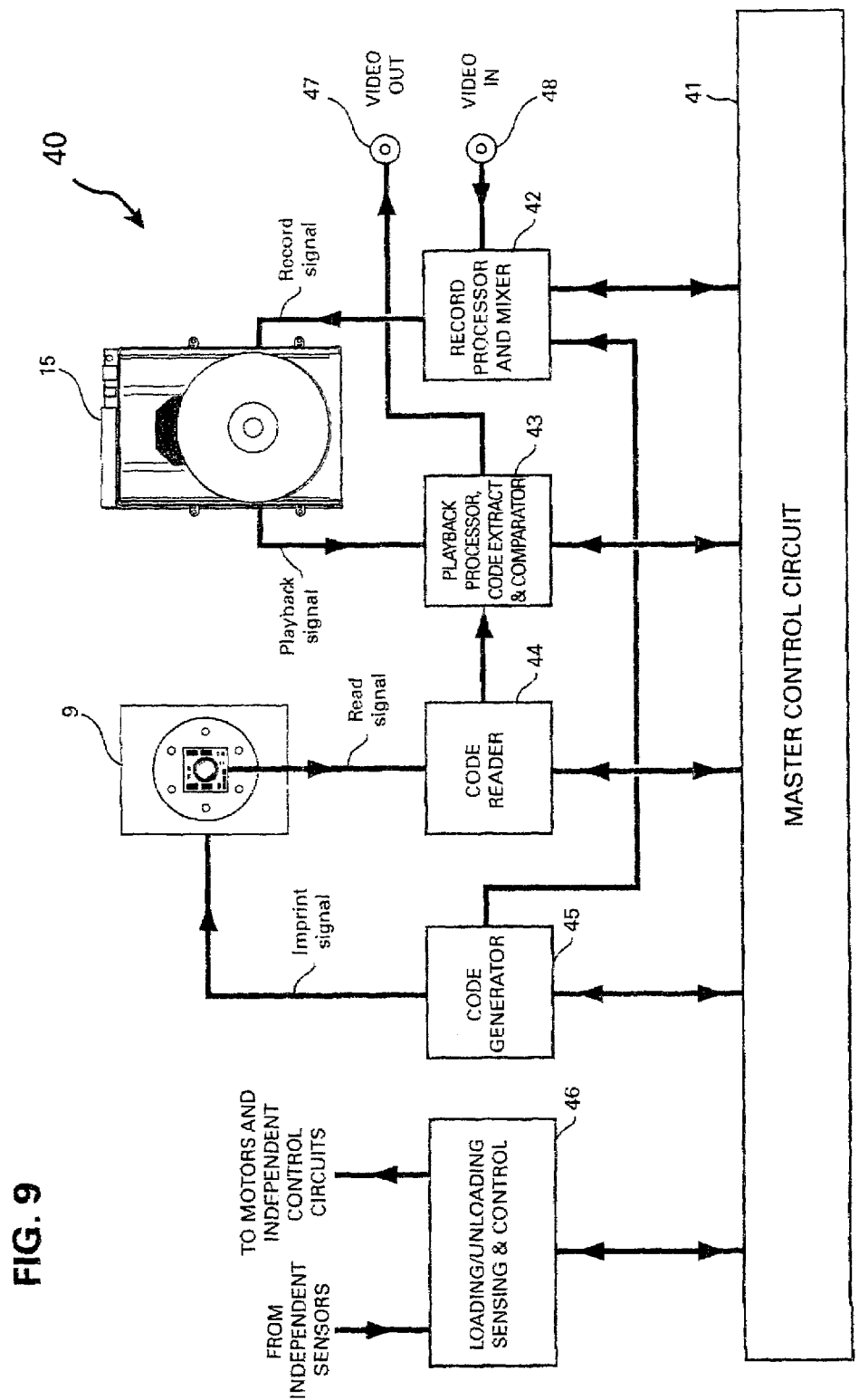
FIG. 9 is a block diagram of the system control of the apparatus of the present invention.

Shown in FIG. 9 is a block diagram of the system control 40 which includes a master control circuit 41 for setting, controlling and operating the system, a record processor circuit 42 for processing video input signals fed through a video input 48 and codes signals fed from a code generator 45 and for feeding the processed signals to the disk recorder 15 in accordance to control command of the master control circuit 41. The code generator 45 also generates an exclusive, individual coded information to the imprinting head 9 for each disk being fed to the imprinting head 9, wherein the coded signals fed to the recorded processor 45 commensurate with each such exclusive, individual coded information fed to the imprinting head 9. A playback processor 43 of the system control 40 receives the read out signals from the disk recorder 15 and the read out code from the imprinting head 9 via the code reader circuit 44 and compares the code contained in the playback signals with the code read by the imprinting head, and feeds the comparison data to the master control circuit 41 and/or generates a yes or no signal to the master control circuit and/or into a display signals through a video out terminal 47. A loading, unloading, sensing and control circuit 46 is fed with sensing signals from well known sensors such as LED interrupters, or micro switches (not shown) for sensing the state of the pull slider 12, sliding table 17, imprinting head 9 and/or gauging such item as the level of fresh disks 5 or the level of accumulated recorded disks 5M shown in FIG. 1. The loading, unloading, sensing and control circuit 46 feeds the received data to the master control circuit 41 and receives control commands from the master control circuit. It is clear that by the read-wire arrangement of the system control 40 it is possible to load pre-imprinted fresh disks and to generate a code signal commensurating with the pre-imprinted code that is read by the reader/sensor 9D of the imprinting head 9 and feed the generated code signal to the record processor circuit 42 for recording the video signals mixed with the generated code. The code signal generated by the code generator 45 may be an encrypted code, and use such data as time and date, station number, camera number, recorder number etc. It can be so designed that the imprinted coded information cannot reveal to the laymen any details of the actual recorded code, and that it will be impossible for a laymen to decipher the recorded code. By this it will only be possible to playback a recorded disk using the digital recording apparatus shown in FIG. 1 and only when the readout code and the extracted code from the playback signal commensurate. Only under such condition it will be possible to verify that the recorded disk is an original recorded media.

Figure 8:
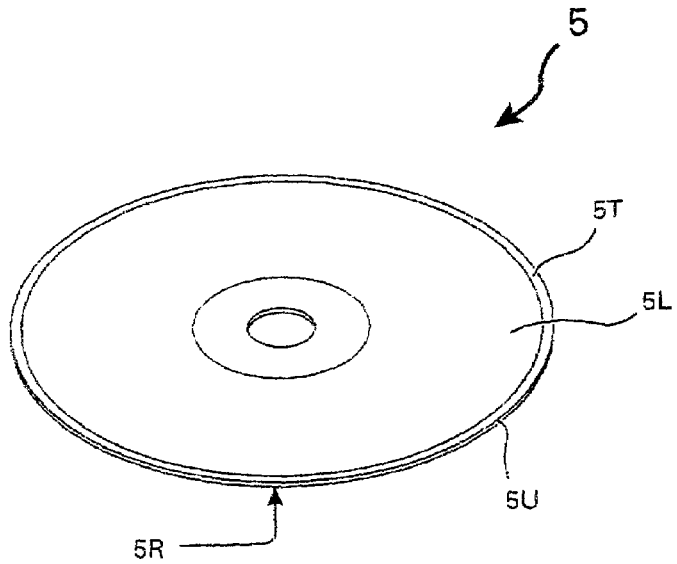
FIG. 8 shows a recording disk with an imprint coat.

The disk 5 shown in FIG. 8 consists of a disk body 5U, a recording layer 5R, a top layer 5T and an imprinted surface or a labeled surface 5L. A pre-imprinted label can be attached to the disk surface to form labeled surface 5L but only if such a pre-imprinted label is a well known label that cannot be removed from the disk without being torn, thereby, preventing the re-use of such label with another disk. The layer or the label 5L shown covers most of a disk surface 5T. However, a smaller label 5L can be used instead, or it is possible to attach such labels by a well known (not shown) label applicator incorporated with the imprint head assembly.

The imprinted surface or the imprinted layer and/or the label 5L can be made of a soft materials or combined with soft materials or such layers can be provided with a soft rim for providing scratch protection to the disks when they are stacked up one on top of the other. Furthermore, the layer 5T can be a layer specifically matching the imprinting process such as optical/chemical process.

For the purpose of submission of evidence in courts it is preferable to use a well-known disk 5 that cannot be erased, nor re-recorded. Such imprinted disk that can only be recorded once and is recorded with a mix of code signals as explained above, provides a proof that such a digitally recorded disk is an original recorded media. Moreover, even the use of re-writable disk that can be erased and/or re-recorded and which is recorded by using the recording processes described above greatly inhibits the ability of a laymen to manipulate any individual picture and/or part of a picture, particularly when the code signals mixed with the picture signals are dynamic, encrypted and vary for every individual picture being recorded. Moreover, the controller can be programmed to read first the coded signals and the exclusive code and generate record stop command to prevent re-recording of a recorded/imprinted disk or to prevent the recording of a twice imprinted disk.

The present invention also provides for a continuous feed of disks to a digital recorder apparatus for instances that do not require the disk to be used as evidence. Alternatively the present invention can be used for an automatic search of a disk for a playback purposes only and the like. It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention:

The invention claimed is:

1. A method for authenticating a disk containing digital video signals recorded onto a fresh disk by a disk recorder, said disk recorder comprising a disk feeder, a recording tray, a recording compartment, a code generator, a code printer and a code mixer, the method comprising the steps of:
   a. feeding said fresh disk from a fresh disk compartment of said disk feeder to said recording tray;
   b. generating an exclusive code and a corresponding code signal for said fresh disk by said code generator, said exclusive code including data identifying the data source of the digital video signal recorded on the disk;
   c. feeding siad exclusive code to said printer and said code signal to said mixer;
   d. aligning said fresh disk with said printer and imprinting said exclusive code onto a label side of said fresh disk, said label side being the surface opposite a surface used for the recording of said video signal;
   e. feeding said fresh disk imprinted with said exclusive code to said recording compartment; and
   f. mixing said code signal with said digital video signal by said code mixer and recording a mixed signal onto said disk imprinted with said exclusive code.

2. The method of claim 1, wherein the data identifying the data source includes one or more of the camera, the recorder, the camera manufacturer, camera ID, camera IP, serial number of the camera, model number of the camera, type of the camera, location of the camera, orientation of the camera, the scene observed by the camera, the object observed by the camera, the time of the recording, the date of the recording, the disk recorder manufacturer, the disk recorder ID, the disk recorder IP, the disk recorder model number, the disk recorder serial number.

3. The method for authenticating a disk according to claim 1, wherein said disk recorder further comprises playback circuit, a code reader, a code extractor and a comparator and is adapted to authenticate the playback of a recorded disk, said method further comprising the steps of:
   g. loading said recorded disk into said fresh disk compartment;
   h. feeding said recorded disk to said recording tray;
   i. aligning said recorded disk with said code reader for reading said exclusive code from said label side of said recorded disk;
   j. playing back said video digital signal which includes said code signal through said playback circuit;
   k. extracting said code signal through said code extractor;
   l. comparing said exclusive code lead by said code leader with said extracted code signal; and
   m. outputting authentication signals when said read exclusive code and the extracted code signals correspond.

4. A method for authenticating a disk containing digital video signals of at least one camera, recorded onto a labeled fresh disk by a disk recorder, wherein said labeled fresh disk includes an exclusive code imprinted onto a label side of said disk, said disk recorder comprising a disk feeder, a recording tray, a recording compartment, a code reader, a code generator and a code mixer, the method comprising the steps of:

a. feeding said labeled fresh disk from a fresh disk compartment of said disk feeder to said recording tray with said label side of said disk facing said code reader;
b. reading said exclusive code by said said code reader;
c. generating with said code generator a code signal further and feeding said code signal to said mixer;
d. feeding said labeled disk to said recording compartment; and
e. mixing said code signal with said digital video signal by said code mixer and recording a combined or mixed signals onto the recording side of said labeled disk, said recording side being the opposite side of said label.

5. The method of claim 3, wherein the data identifying the data source includes one or more of the camera, the recorder, includes a selected data pertaining said camera and said disk recorder selected from a group comprising the camera manufacturer, camera ID, camera IP, serial number of the camera, model number of the camera, type of the camera, location of the camera, orientation of the camera, the scene observed by the camera, the object observed by the camera, the time of the recording, the date of the recording, the disk recorder manufacturer, the disk recorder ID, the disk recorder ID, the disk recorder IP, the disk recorder model number, the disk recorder serial number and a combination thereof.

6. The method for authenticating a disk according to claim 4, wherein said disk recorder further comprises a playback circuit, a code extractor and a comparator, said method further comprising the steps of:

f. loading said recorded disk into said fresh disk compartment;
g. feeding said recorded disk to said recording tray;
h. aligning said recorded disk with said reader for reading said exclusive code from said label side of said recorded disk;
i. playing back said video digital signal mixed with said code signal through said playback circuit;
j. extracting said code signal through said code extractor;
k. comparing said exclusive code read by said code reader with said extracted code signal with said comparator; and
l. outputting authentication signals when said read exclusive code and the extracted said code signal correspond.

7. The method for authenticating a disk according to claim 1, wherein said fresh disk is one of a non-erasable disk and a re-recordable disk.

8. The method for authenticating a disk according to claim 4, wherein said coded disk is one of a non-erasable disk and a re-recordable disk.

9. The method for authenticating a disk according to claim 1, wherein said code printer is selected from a group consisting of a laser printer, an ink jet printer, a heat stamp printer, an ink pad printer, an optical/chemical printer, a ribbon printer and rubber pad printer.

10. The method for authenticating a disk according to claim 1, wherein said code printer is a label applicator for attaching exclusively coded labels onto said label side of said fresh disk.

11. The method for authenticating a disk according to claim 4, wherein said exclusive code is imprinted onto a label attached to said label side of said labeled disk.

12. A disk recorder apparatus for authenticating a disk containing digital video signals recorded onto a fresh disk by a disk recorder, said recorder comprising:

controller including code generator for generating an exclusive code and a corresponding code signal for said fresh disk, said exclusive code and a code mixer for mixing said digital video signal and said code signal;
a fresh disk compartment for loading one or more said fresh disks;
a printer comprising an imprinting head supported by a reciprocal up-down arm, for imprinting said exclusive code onto a label side of said fresh disk;
a disk driver, a recording head and a sliding table including a pull slider for collecting and transporting said fresh disk from said fresh disk compartment to said reciprocal up-down arm for imprinting said exclusive code and to said disk driver and recording head for recording said digital video signal mixed with said code signal onto an imprinted fresh disk;
a collection compartment for collecting the recorded disk;
wherein said plurality table transports back said recorded disk for ejection and said up-down arm causes the newly imprinted fresh disk to eject said recorded disk away from said sliding table into said collection compartment and wherein said label side is the surface opposite to the recording surface of said disk.

13. The disk recorder apparatus for authenticating a disk according to claim 12, wherein said imprinting head includes a code reader and said recording head includes a playback head and said controller includes a code extractor and a code comparator, wherein said code reader reads said exclusive code from said label side of said recorded disk and said playback head plays back said digital video signal mixed with said code signals; and said code extractor extracts said exclusive code from the playback signal and said code comparator outputs authentication signal when the read exclusive code and the extracted exclusive code correspond.

14. A disk recorder apparatus for authenticating a disk containing digital video signals of at least one camera, recorded onto a labeled fresh disk by a disk recorder, said labeled fresh disk includes an exclusive code imprinted onto the label side of said disk, said disk recorder comprising:

controller including code generator for generating a code signal corresponding to said exclusive code for said fresh disk, said code signal further and a code mixer for mixing said digital video signal and said code signal;
a fresh disk compartment for loading one or more said labeled fresh disks;
a code reader supported by a reciprocal up-down arm, for reading said exclusive code from said label side;
a disk driver, a recording head and a sliding table including a pull slider for collecting and transporting said labeled fresh disk from said fresh disk compartment to said reciprocal up-down arm for reading said exclusive code and to said disk driver and said recording head for recording said digital video signals mixed or combined with said code signal onto said labeled fresh disk;
a collection compartment for collecting the recorded disks;
wherein said sliding table transports back said recorded disk for ejection and said up-down arm causes the newly read labeled fresh disk to eject said recorded disk away from said sliding table into said collection compartment and wherein said label side is in the surface opposite to a recording surface of said disk.

15. The disk recorder apparatus for authenticating a disk according to claim 14, wherein said recording head includes a playback head for playing back the recorded digital video signals mixed with said code signal from said recorded disk and said controller included a code extractor and a code comparator; and said code extractor extracts said exclusive code from the playback signal and said code comparator output authentication signal when the read exclusive code and the extraxted exclusive code correspond.

16. The disk recorder apparatus for authenticating a disk according to claim 12, wherein said fresh disk is one of a non-erasable disk and a re-recordable disk.

17. The disk recorder apparatus for authenticating a disk according to claim 14, wherein said labeled disk is one of a non-erasable disk and a re-recordable disk.

18. The diak recorder apparatus for authenticating a disk according to claim 12, wherein said printer is selected from a group consisting of a laser printer, an ink jet printer, a heat stamp printer, an ink pad printer, an optical/chemical printer, a ribbon printer and a rubber pad printer.

19. The disk recorder apparatus for authenticating a disk according to claim 12, wherein said imprinting head is a label applicator for attaching an exclusively coded labels onto said label side of said fresh disk.

20. The diak recorder apparatus for authenticating a disk according to claim 12, wherein the imprinted side of said fresh disk comprises one of a soft imprint layer and a rim.

21. The disk recorder apparatus for authenticating a disk according to claim 14, wherein the coded side of said coded disk comprises one of a soft imprint layer and a rim.

22. The disk recorder apparatus for authenticating a disk according to claim 14, wherein said label comprises one of soft portions and a rim.

23. The disk recorder apparatus for authenticating a disk according to claim 12, wherein said sliding table and said pull slider are combined into one piece.

24. The disk recorder apparatus for authenticating a disk according to claim 14, wherein said sliding table and said pull slider are combined into one piece.

* * * * *